United States Patent [19]

Escaravage

[11] Patent Number: 4,877,287
[45] Date of Patent: Oct. 31, 1989

[54] DEVICE FOR ADJUSTING THE POSITION OF AN ARMREST OF AN AUTOMOBILE VEHICLE SEAT

[75] Inventor: Gerard Escaravage, Valentigney, France

[73] Assignee: ECIA - Equipements Et Composants Pour L'Industrie Automobile, Audincourt, France

[21] Appl. No.: 208,615

[22] Filed: Jun. 20, 1988

[30] Foreign Application Priority Data

Jun. 19, 1988 [FR] France .................. 87 08633

[51] Int. Cl.$^4$ .............................................. A47C 7/54
[52] U.S. Cl. ..................................... 297/417; 297/115
[58] Field of Search ............... 297/61, 113, 417, 330, 297/115, 217; 74/89.17; 49/227, 348

[56] References Cited

U.S. PATENT DOCUMENTS

| | | | |
|---|---|---|---|
| 3,415,016 | 12/1968 | Lystad | 49/227 |
| 3,666,319 | 5/1972 | Molony | 297/113 |
| 4,685,729 | 8/1987 | Heesch et al. | 297/113 |

FOREIGN PATENT DOCUMENTS 444279 3/1936 United Kingdom .................. 49/227

Primary Examiner—James T. McCall
Attorney, Agent, or Firm—Sughrue, Mion, Zinn, Macpeak & Seas

[57] ABSTRACT

The device comprises a frame (2) fixed to the automobile vehicle (3) and a support structure (5) for the armrest (1) which is movable relative to the frame (2) by a reversible motor-speed reducer unit (6) under the control of control means between an active position and a retracted position of the armrest in which the armrest is substantially in the plane defined by the cushion of the seat with which it is associated. The frame has a generally U-shape between the branches (4) of which the support structure (5) of the armrest is movably mounted. The support structure comprises the motor-speed reducer unit (6) which cooperates with means (7) for shifting the support structure and guide means (15,16) adapted to cooperate with curved slots (17,18) in the branches of the frame for guiding the assembly when it is shifted between said two positions.

7 Claims, 1 Drawing Sheet

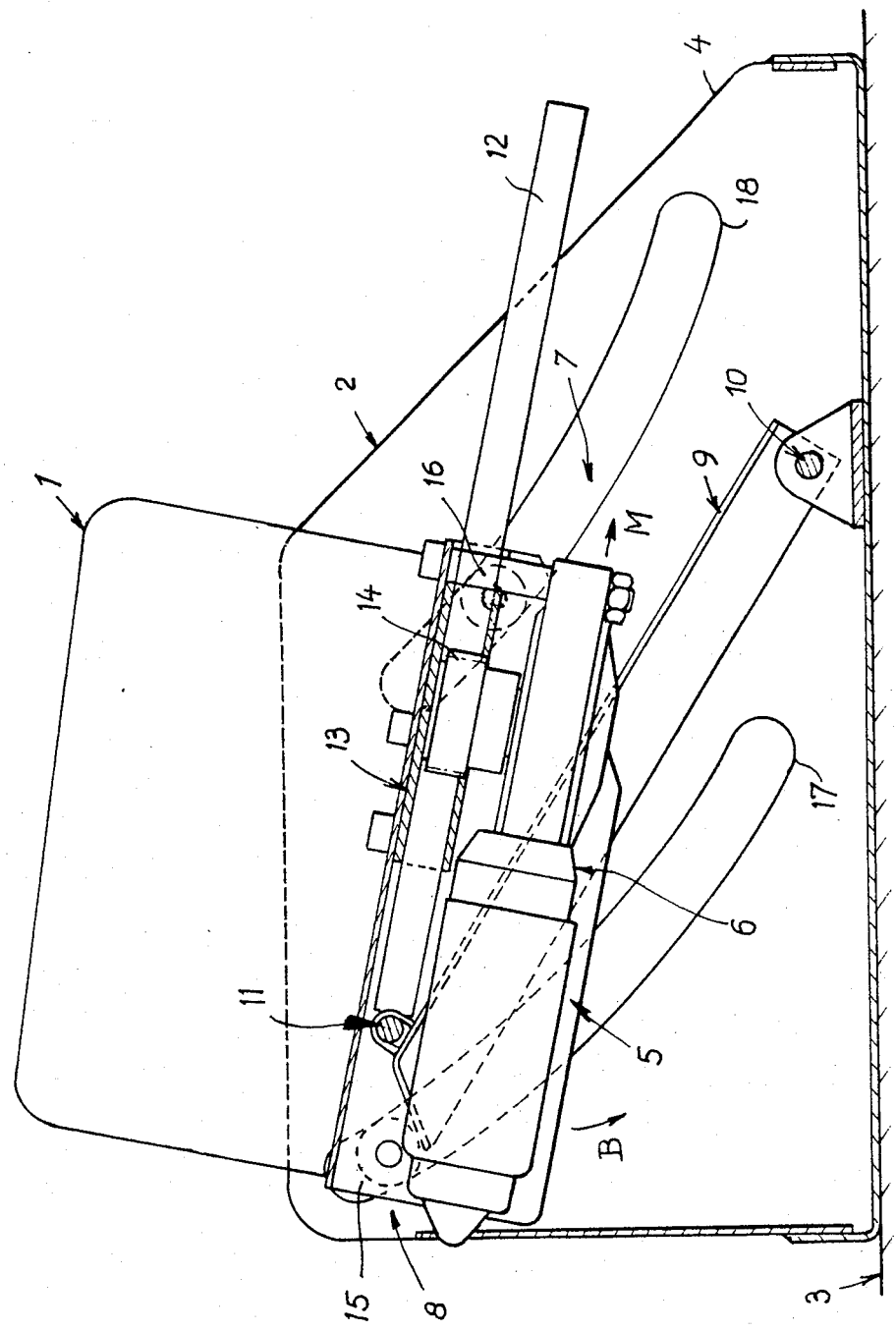

DEVICE FOR ADJUSTING THE POSITION OF AN ARMREST OF AN AUTOMOBILE VEHICLE SEAT

BACKGROUND OF THE INVENTION

The present invention relates to a device for adjusting the position of an armrest of an automobile vehicle seat.

In the prior art, whether these armrests be central armrests associated with the rear seats of automobile vehicles or lateral armrests of the front seats, they are usually mounted to be movable between a retracted position in which they are disposed substantially parallel to the backrests of the seats with which they are associated and an active position substantially parallel to the plane defined by the cushions of the seats.

There consequently results a certain discomfort for the users of in particular the rear seats due to the presence of these armrests in the backrests of the seats.

Furthermore, all these armrests are mounted to be manually movable by the user, which may present in certain cases problems of handling, particularly when the armrest is fully embedded in the backrest of the rear seat.

Lastly, the integration of these armrests raises problems as concerns the fixing of the armrest support structure on the vehicle.

SUMMARY OF THE INVENTION

An object of the invention is to solve these problems by providing a device which is simple, reliable and of low cost.

The invention therefore provides a device for adjusting the position of an automobile vehicle seat armrest, movable between an active position and a retracted position of the armrest substantially in the plane defined by the cushion of the seat with which it is associated, said device comprising a frame fixed to the automobile vehicle and a support structure for the armrest which is movable relative to the frame by a reversible motor-speed reducer unit, under the control of control means.

Advantageously, the frame has a generally U-shape between the branches of which is movably mounted the support structure of the armrest, said support structure comprising said reversible motor-speed reducer unit which cooperates with means for shifting the support structure and guide means adapted to cooperate with complementary means of the branches of the frame for shifting said support structure and therefore said armrests between said two positions.

A better understanding of the invention will be had from the following description which is given solely by way of example with reference to the accompanying drawing which shows a device according to the invention in section.

BRIEF DESCRIPTION OF THE DRAWINGS

The sole FIGURE is a side view of the device for adjusting the position of an armrest of an automobile vehicle seat.

DETAILED DESCRIPTION OF A PREFERRED EMBODIMENT

As can be seen in this drawing, a device for adjusting the position of an armrest 1 of an automobile vehicle seat comprises a frame 2 fixed for example to the floor 3 of an automobile vehicle by any suitable means. The frame 2 advantageously has a U-shape, only the branch 4 of which is shown in the drawing. Movably mounted between the branches of the frame 2 is a support structure 5 for the armrest. This support structure comprises a reversible motor-speed reducer unit 6 which cooperates with means 7 for shifting the support structure 5 relative to the frame 2 between an active position and a retracted position of the armrest 1, in which latter position the support surface of the armrest extends substantially in the plane defined by the cushion of the seat with which the armrest is associated.

The support structure 5 of the armrest 1 includes guide means 8 adapted to cooperate with complementary means of the branches of the frame 2 for guiding the support structure and therefore the armrest when they are shifted between said two positions.

According to the embodiment shown in the drawing, the means 7 for shifting the support structure comprise an element constituting a rocker 9 articulated at one of its ends, at 10, to the frame 2 and at the other end, i.e. at 11, to one of the ends of a rack 12. This rack 12 is guided in the support structure 5 by guide means 13 constituted for example by a tubular member in which the rack 12 is slidable. A gear pinion 14 driven by the output shaft of the motorspeed reducer unit 6 cooperates with the rack 12 for shifting the support structure in the manner described in more detail hereinafter.

The guide means 8 of the support structure 5 advantageously comprise two elements which project from each side of the support structure 5, for example the elements 15 and 16 shown in the drawing and adapted to cooperate with two curved slots, for example 17 and 18, provided in the branches of the frame.

In starting in the active position of the armrest 1 shown in the drawing, supplying current to the motor-speed reducing unit 6 by control means of any known type, causes the support structure 5 to be shifted relative to the rack 12 in a direction shown by the arrow M in the drawing, the rocker 9 being articulated at 10 to the frame.

The support structure 5 therefore tends to move forwardly with reference to the drawing, which results in the downward displacement thereof, as indicated by the arrow B, owing to the interaction between the projecting elements 15 and 16 and the slots 17 and 18. As the rack 12 is articulated at 11 to the rocker 9 and as the latter is articulated to the frame, the downward movement of the assembly located between the branches of the frame continues as long as an action is exerted on the control means or as long as the projecting elements 15 and 16 do not reach a position of abutment against the ends of the curved slots 17 and 18 of the frame.

In starting in the retracted position, the procedure for shifting the armrest to the active position is the opposite of that just described.

The armrest is therefore mounted to be movable between an active position and a retracted position in which the upper surface of the armrest is disposed substantially in the plane defined by the cushion of the seat with which it is associated.

It will be understood that the device according to the invention may be disposed between the front seats of a vehicle or integrated within the rear seat of the latter.

What is claimed is:

1. Device for adjusting the position of an armrest for an automobile vehicle seat, the armrest being movable between an active position of the armrest and a retracted position of the armrest which is substantially in a plane defined by the cushion of the seat with which it is associated, said device comprising a frame for fixing to the automobile vehicle and a support structure for the armrest which is movable relative to the frame between two positions for putting the armrest in said two positions of the armrest, a reversible motor-speed reducer unit drivingly connected to the support structure for shifting the support structure between said two positions of the support structure, and control means for controlling the motor-speed reducer until;

wherein the frame has a generally a U-shape having two branches between which branches the support structure of the armrest is movable, the support structure comprising the motor-speed reducer unit, means for shifting the support structure and guide means cooperative with complementary guide means associated with the branches of the frame, the motor-speed reducer unit being cooperative with the means for shifting the support structure and therefore the armrest between said two positions; and wherein the means for shifting the support structure comprise an element constituting a rocker having one end articulated to the frame and another end, a rack which is guidedly movably mounted on the support structure, a gear pinion cooperative with the rack, an output shaft of the motor-speed reducer unit carrying the gear pinion for shifting the support structure and therefore the armrest between said two positions.

2. Device for adjusting the position of an armrest for an automobile vehicle seat, the armrest being movable between an active position of the armrest and a retracted position of the armrest which is substantially in a plane defined by the cushion of the seat with which it is associated, said device comprising a frame for fixing to the automobile vehicle and a support structure for the armrest which is movable relative to the frame between two positions for putting the armrest in said two positions of the armrest, a reversible motor-speed reducer unit drivingly connected to the support structure for shifting the support structure between said two positions of the support structure, and control means for controlling the motor speed reducer until;

wherein the frame has a generally a U-shape having two branches between which branches the support structure of the armrest is movable, the support structure comprising the motor-speed reducer unit, means for shifting the support structure and guide means cooperative with complementary guide means associated with the branches of the frame, the motor-speed reducer unit being cooperative with the means for shifting the support structure and therefore the armrest between said two positions; and wherein the guide means of the support structure comprise elements projecting from each side of the support structure, and curved slots provided in the branches of the frame and cooperative with said elements projecting from each side of the support structure.

3. Device according to claim 2, wherein the guide means comprise two elements projecting from each side of the support structure, each branch of the frame comprising two curved slots.

4. Device according to claim 1, wherein the guide means of the support structure comprise elements projecting from each side of the support structure, and curved slots provided in the branches of the frame and cooperative with said elements projecting from each side of the support structure.

5. Device according to claim 4, wherein the guide means comprise two elements projecting from each side of the support structure, each branch of the frame comprising two curved slots.

6. Device according to claim 1, combined with the vehicle and disposed between two front seats of the vehicle.

7. Device according to claim 1 combined with the vehicle and incorporated in a cushion of a rear seat of the vehicle.

* * * * *